Patented Sept. 5, 1950

2,521,390

UNITED STATES PATENT OFFICE 2,521,390

MANUFACTURE OF ORGANO SILICON COMPOUNDS BY THE GRIGNARD REACTION

Arthur Edward Meadowcroft, Clifford Shaw, and William Edwin Smith, London, England No Drawing. Application February 12, 1947, Serial No. 728,208. In Great Britain February 13, 1946

6 Claims. (Cl. 260—46.5)

This invention relates to the manufacture of condensation-polymerisation products from organic silicates by the Grignard reaction.

A large number of proposals have been made for preparing silicones by the treatment of silicon tetrachloride with a Grignard reagent, and in many of these proposals it has been suggested that the employment of alkyl, aryl or aralkyl orthosilicates in place of silicon tetrachloride will give equivalent results. So far as the present applicants are aware, however, there has been no specific description in connection with any of these prior proposals of the employment of the above-mentioned orthosilicates in place of silicon tetrachloride in these reactions. It must be presumed, therefore, that in these prior proposals the pure anhydrous orthosilicate was referred to as a possible chemical equivalent of the tetrachloride which was specifically described and was the anhydrous compound.

We have now found that valuable products of somewhat different characteristics can be prepared by employing as the starting material a silicate which has been prepared from a hydrated alcohol which may be the ordinary alcohol of commerce, containing about 5% of water, but in any case the water content of the alcohol should not exceed an amount corresponding to more than one molecular proportion to three molecular proportions of alcohol, that is, a maximum of about 11½% of water by weight.

An important advantage of this ester is its high silicon content, 18.6–19%, as against 12.6% for pure tetraethyl silicate, and 16.5% for silicon tetrachloride. This means that a smaller bulk of this ester is required to give the same yield of silicone as a larger bulk of pure tetraethyl silicate or silicon tetrachloride. In addition the use of ester in place of the latter compound obviates the necessity of handling this obnoxious material.

According to the present invention, therefore, a process for the production of condensation-polymerisation products from organic silicates comprises the steps of treating with a Grignard reagent a silicate which has been prepared from a hydrated alcohol containing a proportion of water corresponding to not more than one molecular proportion to three molecular proportions of alcohol and separating the substituted ester thus obtained from the reaction products.

The substituted esters obtainable as above described may then be submitted to hydrolysis and dehydration followed by fractional distillation, or the product may be submitted to fractional distillation before hydrolysis, as will be described hereinafter. As will be further described the organic silicate may be submitted to refluxing and/or distillation prior to treatment with the Grignard reagent, and in this case hydrolysis of the product may not be necessary as all the hydrolysable groups will have been eliminated either by condensation-polymerisation or by treatment with the Grignard reagent.

According to one feature of the invention the ester may be an ethyl ester prepared from English industrial alcohol containing 4–5% water.

According to another feature of the invention the silicate may be submitted to refluxing and/or fractional distillation, for example as described in the co-pending application of Gluck, Smith and Shaw No. 726,220, filed February 3, 1947, now abandoned, before treatment with the Grignard reagent in the case where the silicate is submitted to prolonged refluxing producing high boiling fractions, the product after treatment with the Grignard reagent is a product of extraordinary stability.

The invention includes alternative methods of carrying out the process above set out, according as to whether the solvent medium used in carrying out the Grignard reaction is employed in excess of the normal quantity, or in the normal quantity and whether the reaction is carried out in a solvent other than ether such as excess of alkyl bromide.

Method I

The process using a nonethereal solvent such as excess of alkyl bromide. The ester used is reacted with an excess of ethyl magnesium bromide in the presence of sufficient excess ethyl bromide to maintain the mixture in a fluid state, and the technique adopted is to add the magnesium slowly to a mixture of the ester and excess ethyl bromide.

Method II

The process using excess Grignard reagent such as ethyl magnesium bromide or chloride in the presence of the normal amount of ether.

Method III

The process using a slight excess of Grignard reagent, such as ethyl magnesium bromide or chloride, in the presence of an excess ether solvent wherein the weight of ether present is of the order of ten times the weight of the magnesium employed.

Method IV

The process using a slight excess of Grignard reagent such as ethyl magnesium bromide or chloride in the presence of a large excess of ether as solvent, wherein the weight of ether present is of the order of forty times the weight of the magnesium employed.

The extension of the liquid phase to this degree appears to have the effect of controlling the reaction to give products agreeing more nearly with the theoretical results, provided that the reaction and refluxing is completed in a single operation.

In all the above methods it is desirable that reaction and subsequent refluxing should be continuous, to obtain maximum reaction of the Grignard reagent and the alkyl or aryl silicate employed.

When reaction is complete the magnesium salts are removed by washing the end mixture with ice cold dilute acid, which must be sufficiently dilute to remove the dissolved magnesium salts without hydrolysing the silicon esters formed. The ether is then removed by distillation at atmospheric or reduced pressures and the concentrated esters may be fractionally distilled at atmospheric or reduced pressures and subsequently remixed in the desired proportions and hydrolysed, or the whole product may be hydrolysed, by refluxing or shaking with 20% aqueous sulphuric acid, with or without the addition of a mutual solvent such as alcohol, and the resultant products distilled under reduced pressure.

Using the latter method, however, the monoorgano silicic acid usually remains as an infusible residue in the distillation flask. The method is satisfactory if the desired product is to be a stable oil, and fractionation of the distillate gives rise to oils of varying viscosities.

If a heat resistant resin is desired, distillation of the silicon esters before hydrolysis is found to give a much less coloured product, which may be water white, and the distillation of the mixed silicone products after hydrolysis must be omitted.

The viscosity and other properties of the final products may be varied by varying the proportion of the mixed substituted silicon compounds, the mixture containing more than a little monosubstituted compounds giving rise to resins which solidify on heating, while pure or nearly pure dialkyl and trialkyl silicols give rise to oils covering a range of viscosities. After condensation the oils may be fractionally distilled to give fractions of varying viscosities.

It was further found that it is possible to produce both the heat resistant type of resin compound and also stable oils from the same reaction mixture thereby effecting considerable economy in the production, both as regards materials, time and labour. According to this feature of the invention, therefore, a process for preparing silicones consists in treating with a Grignard reagent a silicate which has been prepared from hydrated alcohol, wherein the Grignard reagent is employed in the proportion of two molecules thereof to each silicon atom in the organo-silicate treated, and thereafter hydrolysing and separating and concentrating the mixture of silicone co-polymers thus obtained.

If the mixture of co-polymers obtained as above described is submitted to rapid distillation oily liquid distillates are obtained, boiling up to about 300° C., and these may be condensed and collected leaving a residual liquid which on cooling sets to a soft mass of a consistency varying according to the amount of oils removed by distillation. The oils thus obtained may be fractionally distilled to give fractions of varying viscosities and the resin may be dissolved in carbon tetrachloride or other inert solvent and further polymerised to hard solids.

Oils obtained as above described have good heat resistance and electrical properties and consequently may be used for any of the purposes where these properties are required in liquids. More particularly, having high vaporisation points and being non-corrosive of metal parts they are suitable as high temperature lubricants and as transformer fluids, and being without attack on rubber and light metals and having a constant viscosity over a large range of temperature they are suitable for use as power transmission fluids. The distillation process may, of course, be adjusted to give the required physical properties.

*Example I.—Preparation of ethyl silicone oils from partially hydrolysed ethyl silicate*

Partially hydrolysed ethyl silicate, magnesium, and ethyl bromide are reacted in the presence of anhydrous ether at a temperature of approximately 30° C. Suitable quantities are as follows:

Partially hydrolysed ethyl silicate
(E. N. E.) _____ 560 g.- 4 mol.
Magnesium _____ 288 g.-12 mol.
Ethyl bromide _____ 1308 g.-12 mol.
Ether (sodium dried) _____ to 8 litres.

("E. N. E." is an abbreviation for English Neat Ester. This is a so-called "silicon ester" which is produced by the reaction of silicon tetrachloride with industrial ethyl alcohol, for example, an ethyl alcohol of specific gravity 0.822, with the result that instead of obtaining pure tetraethoxysilicane, $Si(OEt)_4$, such as is obtained when one uses substantially pure alcohol, a mixture is obtained that contains in addition to tetraethoxysilicane, a substantial percentage of hexaethoxysilicane, $(EtO)_3Si-O-Si(OEt)_3$, and higher homologues thereof together with some ethyl alcohol. See, for example, "The Industrial Chemist," March 1945, page 131, referring to the King et al. British Patent No. 290,717, as well as Shaw et al. British Patent No. 574,646 which, at page 3, lines 28 to 30, refers to "a mixture of ethyl silicates known as 'Silicon Ester Neat.'")

The reaction is commenced in a 10 litre three necked flask by mixing all of the E. N. E. and magnesium with 30 c. c. of ethyl bromide and 200 c. c. ether. When the initial seed has formed as shown by effervescence and generation of heat, the remainder of the ether is added and then the remainder of the ethyl bromide is added dropwise over a period of approximately four hours, the mixture being stirred meanwhile. The temperature of the mixture is maintained at approximately 30° C., by adjusting the rate of heating by variation in the speed of addition of the ethyl bromide and by control of the temperature of the external water bath.

When all the ethyl bromide is added the mixture is refluxed by heating the water bath to maintain the temperature of the mixture at 30° C., for a further four hours. The mixture is then allowed to settle and cool and the ethereal solution poured onto cracked ice to destroy the magnesium ethoxy bromide, the basic magnesium bromide thus formed being dissolved with sufficient sulphuric acid 20% to give a clear aqueous layer. The solutions are separated, the aqueous layer being ether washed and the ether layer and washings being water washed. The ether layer contains the ethyl-substituted siloxane esters.

The ether solution is then passed through a stripper having a temperature range 80/40° C., and the concentrated esters are collected and distilled. The clear distillate is then hydrolysed by refluxing at approximately 80° C. in the presence of 20% sulphuric acid, being stirred meanwhile. After cooling the separated oils are water washed, dried, and redistilled to remove any monoethyl siliconic acids which may be present. Redistillation may be necessary to complete the purification.

The collected distillate was fractionated, giving the fractions shown below. Refractive indices, molecular weights, silica contents, specific gravities, and kinematic viscosities at 100° F. were determined where possible. Pour points and kinematic viscosities of blends of suitably grouped cuts were measured at −25° F., 0° F. and 100° F., the amounts of the fractions blended being in proportion to their yields.

| Fraction | Boiling Point, °C. | Vol., ml. | Per Cent SiO₂ | Molecular weight | $N_D^{20}$ | S. G. | Kinematic viscosity, cts., 100° F. | Kinematic visc. of Blends, cts. | | | Pour pt., °F. |
|---|---|---|---|---|---|---|---|---|---|---|---|
| | | | | | | | | 100° F. | 0° F. | −25° F. | |
| 1 | 174–178 | 25 | 52.47 | 193.3 | 1.431 | .8559 | 2.52 | | | | |
| 2 | 190–200 | 10 | 44.78 | | 1.430 | .8584 | | | | | |
| 3 | 201–208 | 20 | 37.95 | | 1.430 | .8563 | 1.99 | | | | |
| 4 | 210–218 | 45 | 50.13 | | 1.431 | .8598 | 1.93 | 2.01 | 7.35 | 11.15 | −90 |
| 5 | 220–221 | 60 | 51.06 | 267.3 | 1.430 | .8631 | 1.98 | | | | |
| 6 | 224–226 | 70 | 50.98 | 270.3 | 1.431 | .8651 | 2.04 | | | | |
| 7 | 228–231 | 40 | 51.98 | | 1.431 | .8679 | 2.14 | | | | |
| 8 | 234–240 | 70 | 52.10 | | 1.433 | .8743 | | 2.33 | 8.53 | 13.35 | −90 |
| 9 | 242–258 | 30 | 52.88 | | 1.434 | .8825 | 2.66 | | | | |
| 10 | 276–284 | 45 | 48.40 | | 1.434 | .9047 | 4.10 | | | | |
| 11 | 296–314 | ca. 3 | 55.21 | 429.3 | 1.435 | .9278 | | | | | |
| 12 | 329 | ca. 2.5 | 55.38 | | 1.435 | .9330 | | 4.80 | 20.48 | 38.65 | −90 |
| 13 | 339–436 | ca. 4 | 55.48 | 542.6 | 1.439 | .9449 | | | | | |
| 14 | 360–370 | ca. 5 | 58.16 | 880.6 | 1.440 | .9849 | | | | | |

*Example II.—Simultaneous preparation of ethyl silicone oils and resins from partially hydrolysed ethyl silicate, magnesium and ethyl bromide*

The reaction was carried out as described in Example I, using the quantities:

Partially hydrolysed ethyl silicate
(E. N. E.) _____ 560 g.–4 mol.
Magnesium _____ 192 g.–8 mol.
Ethyl bromide _____ 872 g.–8 mol.
Ether to _____ 8 litres Treatment after reaction was the same as described in Example I. After hydrolysis and condensation, the product is a mixture of oil and resin. Rapid distillation up to a temperature of 340° C. suffices to remove the oil, leaving the silicone resin as a residue, which may be poured out while still liquid, and dissolved in a solvent, such as carbon tetrachloride, when cold.

This resin requires heating to a temperature of 200° C. for four hours to complete the curing. By the addition of a suitable catalyst, e. g. benzoyl peroxide, this cure time may be reduced. A solution of the resin in CCl₄ may be used in the preparation of insulating films on metal strips by coating the strips with the solution, drying off the solvent, followed by stoving at 200° C. for four hours.

*Example III.—Preparation of an ethyl silicone resin from partially hydrolysed ethyl silicate*

The reaction was carried out as in Example I, using the quantities:

Partially hydrolysed ethyl silicate _____g__ 280
Magnesium _____g__ 73
Ethyl bromide _____g__ 236
Ether, sodium dried, to _____litres__ 4

Treatment after reaction was as described in Example I, yielding an ethyl silicone resin, with properties similar to those of the resin described in Example II.

*Example IV*

175 gms. of ethyl silicate resin prepared by condensation-polymerisation as described in Example I of the aforesaid application of Gluck, Smith and Shaw, Serial No. 726,220, and containing 56.9% SiO₂ was reacted with ethyl magnesium bromide, in such a proportion as to give an ethyl to silicon ratio of 2½ to 1. After the reaction was complete the product was treated as described in Example I. An ether soluble silicone type resin was produced.

What we claim is:

1. A process for the production of substituted siloxanes which comprises reacting with an alkyl Grignard reagent a silicic acid ester of ethyl alcohol, said ester comprising a partially hydrolyzed ethyl silicate obtained by reacting silicon tetrachloride and a hydrated ethyl alcohol containing from about 4 to 11½% of water by weight, thereby replacing a portion of the ethoxy groups of the silicate by alkyl radicals from the Grignard reagent, and separating the magnesium compounds present in the reaction mixture from the remaining reaction products.

2. A process as in claim 1 wherein the alkyl Grignard reagent is an ethyl magnesium halide.

3. A process as in claim 1, wherein the alkyl Grignard reagent is ethyl magnesium bromide.

4. A process for the production of substituted siloxanes which comprises reacting with an alkyl Grignard reagent a silicic acid ester of ethyl alcohol, said ester comprising a partially hydrolyzed ethyl silicate obtained by reacting silicon tetrachloride and a hydrated ethyl alcohol containing from about 4 to 11½% of water by weight, thereby replacing a portion of the ethoxy groups of the silicate by alkyl radicals from the Grignard reagent, separating the magnesium compounds present in the reaction mixture from the remaining reaction products, hydrolyzing the ester groups not substituted in the siloxanes comprised in said remaining reaction products and dehydrating the hydrolysate by heating and recovering the resulting products.

5. A process as in claim 4 in which the alkyl Grignard reagent is an ethyl magnesium halide.

6. A process as in claim 4 wherein the alkyl Grignard reagent is ethyl magnesium bromide.

ARTHUR EDWARD MEADOWCROFT.
CLIFFORD SHAW.
WILLIAM EDWIN SMITH.

REFERENCES CITED

The following references are of record in the file of this patent:

UNITED STATES PATENTS

| Number | Name | Date |
|---|---|---|
| 2,375,998 | McGregor et al. | May 15, 1945 |
| 2,377,689 | Hyde | June 5, 1945 |
| 2,380,057 | McGregor et al. | July 10, 1945 |
| 2,426,121 | Rust et al. | Aug. 19, 1947 |

OTHER REFERENCES

Schumb et al.: Journ. Amer. Chem. Soc., vol. 61, 1939, pp. 363 to 366.